United States Patent
Chen

(10) Patent No.: US 7,778,831 B2
(45) Date of Patent: Aug. 17, 2010

(54) VOICE RECOGNITION WITH DYNAMIC FILTER BANK ADJUSTMENT BASED ON SPEAKER CATEGORIZATION DETERMINED FROM RUNTIME PITCH

(75) Inventor: Ruxin Chen, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 532 days.

(21) Appl. No.: 11/358,001

(22) Filed: Feb. 21, 2006

(65) Prior Publication Data

US 2007/0198263 A1    Aug. 23, 2007

(51) Int. Cl.
  *G10L 17/00*  (2006.01)
  *G10L 15/28*  (2006.01)
  *G10L 15/14*  (2006.01)

(52) U.S. Cl. .............. 704/246; 704/207; 704/208; 704/250; 704/255; 704/256; 704/256.2

(58) Field of Classification Search .......... 704/207, 704/208, 246, 256, 256.2, 250, 255
  See application file for complete search history.

(56) References Cited

U.S. PATENT DOCUMENTS

| | | | |
|---|---|---|---|
| 4,956,865 A | 9/1990 | Lehnig et al. ............ 704/241 |
| 4,977,598 A | 12/1990 | Doddington et al. ...... 704/255 |
| RE33,597 E | 5/1991 | Levinson et al. .......... 704/256 |
| 5,031,217 A | 7/1991 | Nishimura .............. 704/256.4 |
| 5,050,215 A | 9/1991 | Nishimura .............. 704/256.4 |
| 5,129,002 A | 7/1992 | Tsuboka .................. 704/246 |
| 5,148,489 A | 9/1992 | Erell et al. ................ 704/226 |
| 5,222,190 A | 6/1993 | Pawate et al. ............ 704/200 |
| 5,228,087 A | 7/1993 | Bickerton ................ 704/232 |
| 5,345,536 A | 9/1994 | Hoshimi et al. .......... 704/243 |
| 5,353,377 A | 10/1994 | Kuroda et al. ........... 704/256.1 |
| 5,438,630 A | 8/1995 | Chen et al. ................ 382/159 |
| 5,455,888 A | 10/1995 | Iyengar et al. ............ 704/203 |

(Continued)

FOREIGN PATENT DOCUMENTS

EP    0866442    9/1998

(Continued)

OTHER PUBLICATIONS

Claes et al. "A Novel Feature Transformation for Vocal Tract Length Normalization in Automatic Speech Recognition", IEEE Transactions on Speech and Audio Processing, vol. 6, 1998.*

(Continued)

*Primary Examiner*—David R Hudspeth
*Assistant Examiner*—Edgar Guerra-Erazo
(74) *Attorney, Agent, or Firm*—Joshua D. Isenberg; JDI Patent

(57) ABSTRACT

Voice recognition methods and systems are disclosed. A voice signal is obtained for an utterance of a speaker. A runtime pitch is determined from the voice signal for the utterance. The speaker is categorized based on the runtime pitch and one or more acoustic model parameters are adjusted based on a categorization of the speaker. The parameter adjustment may be performed at any instance of time during the recognition. A voice recognition analysis of the utterance is then performed based on the acoustic model.

13 Claims, 1 Drawing Sheet

U.S. PATENT DOCUMENTS

| | | | |
|---|---|---|---|
| 5,459,798 A | 10/1995 | Bailey et al. | 382/218 |
| 5,473,728 A | 12/1995 | Luginbuhl et al. | 704/243 |
| 5,502,790 A | 3/1996 | Yi | 704/256 |
| 5,506,933 A | 4/1996 | Nitta | 704/256 |
| 5,509,104 A | 4/1996 | Lee et al. | 704/256 |
| 5,535,305 A | 7/1996 | Acero et al. | 704/256 |
| 5,581,655 A | 12/1996 | Cohen et al. | 704/245 |
| 5,602,960 A | 2/1997 | Hon et al. | 704/207 |
| 5,608,840 A | 3/1997 | Tsuboka | 704/236 |
| 5,615,296 A | 3/1997 | Stanford et al. | 704/270.1 |
| 5,617,486 A | 4/1997 | Chow et al. | 382/181 |
| 5,617,509 A | 4/1997 | Kusher et al. | 704/256 |
| 5,627,939 A | 5/1997 | Huang et al. | 704/256 |
| 5,649,056 A | 7/1997 | Nitta | 704/256 |
| 5,649,057 A | 7/1997 | Lee et al. | 704/256 |
| 5,655,057 A | 8/1997 | Takagi | 704/233 |
| 5,677,988 A | 10/1997 | Takami et al. | 704/256 |
| 5,680,506 A | 10/1997 | Kroon et al. | 704/203 |
| 5,680,510 A | 10/1997 | Hon et al. | 704/255 |
| 5,696,873 A * | 12/1997 | Bartkowiak | 704/216 |
| 5,719,996 A | 2/1998 | Chang et al. | 704/256 |
| 5,745,600 A | 4/1998 | Chen et al. | 382/218 |
| 5,758,023 A | 5/1998 | Bordeaux | 704/232 |
| 5,787,396 A | 7/1998 | Komori et al. | 704/256 |
| 5,794,190 A | 8/1998 | Linggard et al. | 704/232 |
| 5,799,278 A | 8/1998 | Cobbett et al. | 704/256 |
| 5,812,974 A | 9/1998 | Hemphill et al. | 704/256.4 |
| 5,825,978 A | 10/1998 | Digalakis et al. | 704/256 |
| 5,835,890 A | 11/1998 | Matsui et al. | |
| 5,860,062 A | 1/1999 | Taniguchi et al. | 704/256 |
| 5,880,788 A | 3/1999 | Bregler | 348/515 |
| 5,890,114 A | 3/1999 | Yi | 704/256 |
| 5,893,059 A | 4/1999 | Raman | 704/256.2 |
| 5,903,865 A | 5/1999 | Ishimitsu et al. | 704/256 |
| 5,907,825 A | 5/1999 | Tzirkel-Hancock | 704/243 |
| 5,913,193 A * | 6/1999 | Huang et al. | 704/258 |
| 5,930,753 A | 7/1999 | Potamianos et al. | 704/256.2 |
| 5,937,384 A | 8/1999 | Huang et al. | 704/256 |
| 5,943,647 A | 8/1999 | Ranta | 704/251 |
| 5,956,683 A | 9/1999 | Jacobs et al. | 704/270.1 |
| 5,963,903 A | 10/1999 | Hon et al. | 704/254 |
| 5,963,906 A | 10/1999 | Turin | 704/256 |
| 5,983,178 A | 11/1999 | Naito et al. | 704/245 |
| 5,983,180 A | 11/1999 | Robinson | 704/254 |
| 6,009,390 A | 12/1999 | Gupta et al. | 704/240 |
| 6,009,391 A | 12/1999 | Asghar et al. | 704/243 |
| 6,023,677 A | 2/2000 | Class et al. | 704/254 |
| 6,035,271 A * | 3/2000 | Chen | 704/207 |
| 6,061,652 A | 5/2000 | Tsuboka et al. | 704/245 |
| 6,067,520 A | 5/2000 | Lee | 704/270 |
| 6,078,884 A | 6/2000 | Downey | 704/243 |
| 6,092,042 A | 7/2000 | Iso | 704/240 |
| 6,112,175 A | 8/2000 | Chengalvarayan | 704/256.5 |
| 6,138,095 A | 10/2000 | Gupta et al. | 704/234 |
| 6,138,097 A | 10/2000 | Lockwood et al. | 704/256.2 |
| 6,148,284 A | 11/2000 | Saul | 704/256.4 |
| 6,151,573 A | 11/2000 | Gong | 704/256.2 |
| 6,151,574 A | 11/2000 | Lee et al. | 704/256 |
| 6,188,982 B1 | 2/2001 | Chiang | 704/256.5 |
| 6,223,159 B1 | 4/2001 | Ishii | 704/256.7 |
| 6,226,612 B1 | 5/2001 | Srenger et al. | 704/256.2 |
| 6,236,963 B1 | 5/2001 | Naito et al. | 704/241 |
| 6,246,980 B1 | 6/2001 | Glorion et al. | 704/231 |
| 6,253,180 B1 | 6/2001 | Iso | 704/244 |
| 6,292,776 B1 | 9/2001 | Chengalvarayan | 704/219 |
| 6,405,168 B1 | 6/2002 | Bayya et al. | 704/256 |
| 6,442,519 B1 * | 8/2002 | Kanevsky et al. | 704/243 |
| 6,446,039 B1 | 9/2002 | Miyazawa et al. | |
| 6,456,965 B1 * | 9/2002 | Yeldener | 704/207 |
| 6,526,380 B1 | 2/2003 | Thelen et al. | |
| 6,629,073 B1 | 9/2003 | Hon et al. | 704/256.4 |
| 6,662,160 B1 | 12/2003 | Chien et al. | 704/256 |
| 6,671,666 B1 | 12/2003 | Ponting et al. | 704/233 |
| 6,671,668 B2 | 12/2003 | Harris | 704/246 |
| 6,671,669 B1 | 12/2003 | Garudadri et al. | 704/255 |
| 6,681,207 B2 | 1/2004 | Garudadri | 704/256 |
| 6,721,699 B2 * | 4/2004 | Xu et al. | 704/207 |
| 6,801,892 B2 | 10/2004 | Yamamoto | 704/256 |
| 6,832,190 B1 | 12/2004 | Junkawitsch et al. | 704/255 |
| 6,868,382 B2 | 3/2005 | Shozakai | 704/254 |
| 6,901,365 B2 | 5/2005 | Miyazawa | 704/256 |
| 6,907,398 B2 | 6/2005 | Hoege | 704/265 |
| 6,934,681 B1 | 8/2005 | Emori et al. | 704/250 |
| 6,980,952 B1 | 12/2005 | Gong | 704/234 |
| 7,003,460 B1 | 2/2006 | Bub et al. | 704/256 |
| 7,133,535 B2 | 11/2006 | Huang et al. | 382/100 |
| 7,139,707 B2 | 11/2006 | Sheikhzadeh-Nadjar et al. | 704/243 |
| 2004/0059576 A1 | 3/2004 | Lucke | |
| 2004/0078195 A1 | 4/2004 | Oda et al. | |
| 2005/0038655 A1 | 2/2005 | Mutel et al. | |
| 2005/0065789 A1 | 3/2005 | Yacoub et al. | |
| 2005/0286705 A1 | 12/2005 | Contolini et al. | |
| 2006/0178876 A1* | 8/2006 | Sato et al. | 704/225 |
| 2007/0112566 A1 | 5/2007 | Chen | 704/240 |

FOREIGN PATENT DOCUMENTS

WO    WO 2004111999 A1 * 12/2004

OTHER PUBLICATIONS

M. Tamura, T. Masuko, K. Tokuda, T. Kobayashi, "Adaptation of pitch and spectrum for HMM-based speech synthesis using MLLR," proc of ICASSP 2001, vol. 1, pp. 1-1, May 2001.*

Cherif A, "Pitch and formants extraction algorithm for speech processing," Electronics, Circuits and Systems, 2000, ICECS 2000. The 7th IEEE International Conference on vol. 1, Dec. 17-20, 2000 pp. 595-598 vol. 1.*

Iseli, M., Y. Shue, and A. Alwan (2006). Age- and Gender-Dependent Analysis of Voice Source Characteristics, Proc. ICASSP, Toulouse.*

Vergin, R., A. Farhat, and D. O'Shaughnessy, Robust gender-dependent acoustic-phonetic modeling in continuous speech recognition based on a new automatic male/female classification, in Proceedings ICSLP 96. Fourth International Conference on Spoken Language Processing, H.T. Bunnell and W. Idsardi, Editors: Philadelphia, PA, USA. pp. 1081-1084, 1996.*

Lawrence Rabiner, "A Tutorial on Hidden Markov Models and Selected Application Speech Recognition"—Proceeding of the IEEE, vol. 77, No. 2, Feb. 1989.

Steven B. Davis et al., "Comparison of Parametric Representations for Monosyllabic Word Recognition in Continuously Spoken Sentences"—IEEE Transactions on Acoustics, Speech, and Signal Processing, vol. ASSP 28, No. 4, p. 357-366, Aug. 1980.

G. David Forney, Jr., "The Viterbi Agorithm"—Proceeding of the IEEE, vol. 61, No. 3, p. 268-278, Mar. 1973.

Kai-Fu Lee et al., "Speaker-Independent phone Recognition Using Hidden Markov Models"—IEEE Transaction in Acoustics, Speech, and Signal Processing, vol. 37, No. 11, p. 1641-1648, Nov. 1989.

Hans Werner Strube, "Linear Prediction on a Warped Frequency Scale,"—The Journal of the Acoustical Society of America, vol. 68, No. 4, p. 1071-1076, Oct. 1980.

Leonard E. Baum et al., "A Maximization Technique Occurring In The Statistical Analysis of Probabilistic Functions of Markov Chains,"—The Annals of Mathematical Statistics, vol. 41, No. 1, p. 164-171, Feb. 1970.

Rohit Sinha et al., "Non-Uniform Scaling Based Speaker Normalization" 2002 IEEE, May 13, 2002, vol. 4, pp. I-589-I-592.

Li Lee et al., "Speaker Normalization Using Efficient Frequency Wraping Procedures" 1996 IEEE, vol. 1, pp. 353-356.

International application No. PCT/US2007/061707, "The International Search Report" and "The Written Opinion of the International Searching Authority".

U.S. Appl. No. 11/358,272 to inventor Ruxin Chen, filed Feb. 21, 2006.

International Search Report and Written Opinion of the International Searching Authority dated Oct. 27, 2008—International Patent Application No. PCT/US07/61707, 9 pages.

L. Lee et al., "A Frequency Warping Approach to Speaker Normalization", IEEE Transaction on Speech and Audio and Processing, vol. 6, No. 1, pp. 49-60, Jan. 1998.

W.H Abdulla et al., "Improving Speech Recognition Performance Through Gender Separation", 2001, In Proceeding of ANNES, pp. 218-222.

Office Action dated May 28, 2009 for U.S. Appl. No. 11/358,272.

Final Office Action dated Dec. 11, 2010 issued for U.S. Appl. No. 11/358,272.

\* cited by examiner

VOICE RECOGNITION WITH DYNAMIC FILTER BANK ADJUSTMENT BASED ON SPEAKER CATEGORIZATION DETERMINED FROM RUNTIME PITCH

CROSS-REFERENCE TO RELATED APPLICATION

This application is related to commonly-assigned U.S. patent application 11/358,272 entitled "VOICE RECOGNITION WITH PARALLEL GENDER AND AGE NORMALIZATION" by Ruxin Chen, which is filed the same day as the present application, the entire disclosures of which are incorporated herein by reference.

FIELD OF THE INVENTION

This application relates to voice recognition and more particularly to voice recognition systems that adapt to speakers based on pitch.

BACKGROUND OF THE INVENTION

Voice and speech recognition technologies allow computers and other electronic devices equipped with a source of sound input, such as a microphone, to interpret human speech, e.g., for transcription or as an alternative method of interacting with a computer. Speech recognition software is being developed for use in consumer electronic devices such as mobile telephones, game platforms, personal computers and personal digital assistants. In a typical speech recognition algorithm, a time domain signal representing human speech is broken into a number of time windows and each window is converted to a frequency domain signal, e.g., by fast Fourier transform (FFT). This frequency or spectral domain signal is then compressed by taking a logarithm of the spectral domain signal and then performing another FFT. From the compressed spectrum (referred to as a cepstrum), a statistical model can be used to determine phonemes and context within the speech represented by the signal. The cepstrum can be seen as information about rate of change in the different spectral bands within the speech signal. For speech recognition applications, the spectrum is usually first transformed using the Mel Frequency bands. The result is called the Mel Frequency Cepstral Coefficients or MFCCs. A frequency f in hertz (cycles per second) may be converted to a mel frequency m according to: $m = (1127.01048 \text{ Hz}) \log_e(1 + f/700)$. Similarly a mel frequency m can be converted to a frequency f in hertz using: $f = (700 \text{ Hz})(e^{m/1127.01048} - 1)$.

In voice recognition the spectrum is often filtered using a set of triangular-shaped filter functions. The filter functions divide up the spectrum into a set of partly overlapping bands that lie between a minimum frequency $f_{min}$ and a maximum frequency $f_{max}$. Each filter function is centered on a particular frequency within a frequency range of interest. When converted to the mel frequency scale each filter function may be expressed as a set of mel filter banks where each mel filter bank $MFB_i$ is given by:

$$MFB_i = \left(\frac{mf - mf_{min}}{mf_{max} - mf_{min}}\right) i$$

where the index i refers to the filter bank number and $mf_{min}$ and $mf_{max}$ are the mel frequencies corresponding to $f_{min}$ and $f_{max}$.

The choice of $f_{min}$ and $f_{max}$ determines the filter banks that are used by a voice recognition algorithm. Typically, $f_{min}$ and $f_{max}$ are fixed by the voice recognition model being used. One problem with voice recognition is that different speakers may have different vocal tract lengths and produce voice signals with correspondingly different frequency ranges. To compensate for this voice recognition systems may perform a vocal tract normalization of the voice signal before filtering. By way of example, the normalization may use a function of the type:

$$f' = f + \frac{1}{\pi \arctan\left(\frac{\sin(2\pi f)}{1 - \alpha\cos(2\pi f)}\right)}$$

where f' is the normalized frequency and α is a parameter adjusts a curvature of the normalization function.

The components of a speech signal having N different mel frequency bands may be represented as a vector A having N components. Each component of vector A is a mel frequency coefficient of the speech signal. The normalization of the vector A typically involves a matrix transformation of the type:

F'=[M]·F+B, where [M] is an N×N matrix given by:

$$[M] = \begin{bmatrix} M_{11} & M_{12} & \cdots & M_{1N} \\ M_{21} & M_{22} & \cdots & M_{2N} \\ \vdots & \vdots & \vdots & \vdots \\ M_{N1} & M_{21} & \cdots & M_{NN} \end{bmatrix}$$

and B is a bias vector given by:

$$B = \begin{bmatrix} B_1 \\ B_2 \\ \vdots \\ B_N \end{bmatrix},$$

F' and F are vectors of the form:

$$F = \begin{bmatrix} F_1 \\ F_2 \\ \vdots \\ F_N \end{bmatrix}, F' = \begin{bmatrix} F'_1 \\ F'_2 \\ \vdots \\ F'_N \end{bmatrix},$$

where the matrix coefficients $M_{ij}$ and vector components $B_i$ are computed offline to maximize probability of an observed speech sequence in a HMM system. Usually for a given frame and given feature F', the observed probability is the computed by a Gaussian function:

$$Gaussian_k(F'_0 \ldots F'_n) = \frac{1}{\sqrt{\delta_k}} \exp\left(-\sum_i \frac{(F'_i - \mu_{ki})^2}{2 \cdot \sigma_{ki}^2}\right).$$

Each component of the normalized vector F' is a mel frequency component of the normalized speech signal.

It is known that male and female speakers produce voice signals characterized by different mel frequency coefficients (MFCC). In the prior art, voice recognition systems have used training to differentiate between whether the speaker is male or female and adjust the acoustic model used in voice recognition based on whether the speaker is male or female. Typically, the acoustic model is trained by having a number, e.g., 10, male speakers and an equal number of female speakers speak the same words to produce voice samples. Feature analyses based on the voice samples are combined together into a super model for voice recognition.

A major drawback to the above normalization is that the vector F may have as many as 40 components. Consequently, the matrix [M] could have as many as 1600 coefficients. Computation of such a large number of coefficients can take too long for the voice recognition algorithm to adapt.

Furthermore, since prior art voice recognition systems and methods use fixed values of $f_{min}$, $f_{max}$, $mf_{min}$ and $mf_{max}$ for filtering and normalization, they do not adequately account for variations in vocal tract length amongst speakers. Consequently, speech recognition accuracy may be less than optimal. Thus, there is a need for voice recognition systems and methods that overcome such disadvantages.

SUMMARY OF THE INVENTION

The disadvantages associated with the prior art are overcome by embodiments of the present invention directed to voice recognition methods and systems. According to embodiments of the invention a voice signal is obtained for an utterance of a speaker. A runtime pitch is determined from the voice signal for the utterance. The speaker is categorized based on the runtime pitch and one or more acoustic model parameters are adjusted based on a categorization of the speaker. A voice recognition analysis of the utterance is then performed based on the acoustic model parameters.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the embodiments of the invention described below are set forth without any loss of generality to, and without imposing limitations upon, the claimed invention.

Figure 1:
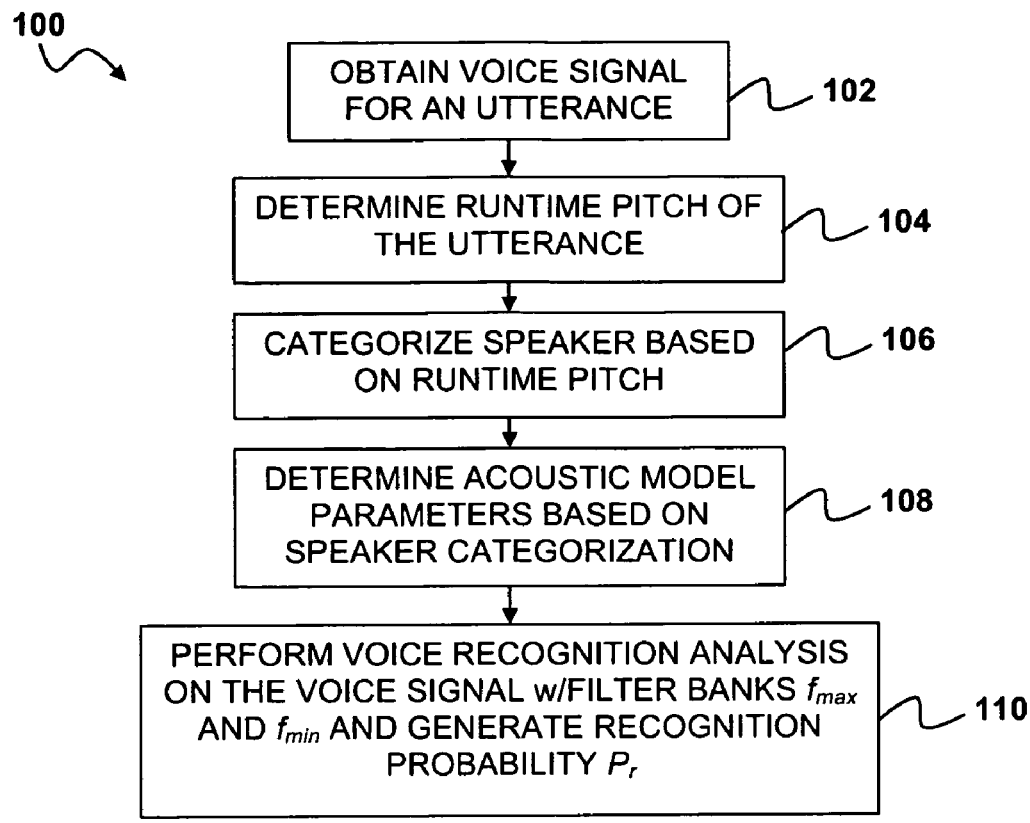
FIG. 1 is a flow diagram illustrating a voice recognition algorithm according to an embodiment of the present invention.

According to an embodiment of the present invention a voice recognition method 100 may proceed as illustrated in FIG. 1A. At 102 a voice signal is obtained for an utterance from a speaker. The voice signal may be obtained in any conventional fashion, e.g., using a microphone and a waveform digitizer to put the voice signal into a digital format. The voice signal may be obtained by over-sampling the voice signal at a sampling frequency that is greater than a working feature analysis frequency. In particular, the sampling frequency may be greater than a training time speech sampling rate. By way of example, and without limitation, if the voice signal is characterized by a working feature analysis frequency of 12 kilohertz the signal may be sampled at a sampling frequency of e.g., 16-22 kilohertz.

At 104, a runtime pitch value $p_{run}$ is determined for the utterance. There are a number of ways to determine the runtime pitch $p_{run}$. For example, $p_{run}$ may be a moving average pitch $p_{avg}(t)$ may be calculated over a given time window including time t by:

$$p_{avg}(t) = \frac{1}{NP}\sum_{t_i} p(t_i), \quad \text{(Equation 1)}$$

where the sum is taken over a number NP of pitch measurements taken at times $t_i = \{t-(NP-1), t-(NP-2), \ldots, t\}$ during the time window for pitch probabilities above a predetermined threshold. One simple way of computing pitch probability is $$prob(\text{pitch}) = \frac{correlation\left(\frac{1}{\text{pitch}}\right)}{correlation(0)} \text{ where } correlation(t)$$
$$= \sum_i signal(t+i)signal(i)$$

is the correlation of the analysis speech signal. Alternatively, the runtime pitch $p_{run}$ may be related to the current pitch, e.g., by:

$$p_{run}(t) = c \cdot p_{run}(t-1) + (1-c) \cdot p(t), \text{ for } t>0 \text{ and } p_{run}(0) = p(0), \text{ for } t=0 \quad \text{(Equation 2)}$$

where c is a constant between 0 and 1 and that p(t) is a current pitch value at time t. The value of the constant c is related to the window size. For example a value of c=0 corresponds to no window (in which case $p_{run}(t) = p(t)$) and a value of c=1 corresponds to an infinite window (in which case $p_{run}(t) = p_{run}(t-1)$). Note that for values of t>0, pitch values for times prior to t contribute to the value of the runtime pitch $p_{run}(t)$. This may be illustrated with a numerical example in which c=0.6. In such a case, Equation 2 gives:

$p_{run}(0) = p(0)$ $p_{run}(1) = 0.6 \cdot p_{run}(0) + (1-c) \cdot p(1) = 0.6 \cdot p(0) + 0.4 \cdot p(1)$ $p_{run}(2) = 0.6 \cdot p_{run}(1) + (1-c) \cdot p(2) = 0.6 * (0.6 \cdot p(0) + 0.4 \cdot p(1)) + 0.4 \cdot p(2)$ In some embodiments of the invention $p_{run}(t)$ may be calculated according to Equation 2 if the pitch probability is above some threshold, e.g., above about 0.4.

By way of example, the speaker categorization performed at 106 of FIG. 1A may be based on the speaker's age and/or gender. For example, from training data it may be determined that average pitch for male, female and child speakers fall into different ranges. The speaker may be categorized from the pitch range into which the current pitch from the voice signal falls. By way of example, an adult male speaker has an average pitch between about 120 Hz and about 160 Hz, an adult female speaker has an average pitch between about 180 Hz and about 220 Hz and a child speaker has an average pitch greater than about 220. If the current pitch is 190 Hz, the speaker would be categorized as a female speaker. In any of these cases, the average pitch for the speaker may be included as a feature in vector F.

Once the speaker has been categorized, the parameters of the acoustic model may be selected accordingly as indicated at 108. These parameters are then used in a voice recognition analysis at 110. The choice of parameters depends on the type of acoustic model used in the voice recognition analysis. For example, the voice recognition analysis may filter the voice signal using a set of filter functions. The filter functions, e.g., triangular-shaped filter functions, divide up the spectrum into a set of partly overlapping bands. Each voice recognition analysis uses a filter bank defined by a different maximum frequency $f_{max}$ and a different minimum frequency $f_{min}$. The $f_{max}$ and $f_{min}$ may be frequencies on the Hertz scale or pitches on the mel scale. The maximum frequency $f_{max}$ refers to an upper limit of the frequency range of the filter bank and the minimum frequency $f_{min}$ refers to a lower limit of the frequency range of the filter bank. The values of the parameters $f_{min}$ and $f_{max}$ may be adjusted dynamically at any instance of time during the voice recognition analysis, e.g., for any time window during the voice recognition analysis. The voice recognition analysis produces a recognition probability $P_r$ of recognition of one or more speech units. The speech units may be phrases, words, or sub-units of words, such as phonemes.

By way of example, once the speaker has been categorized as a male, female or child, the values of $f_{min}$ and $f_{max}$ for voice recognition analysis of the utterance may be selected accordingly. For example, if it is assumed that the speaker is a man, $f_{min}$ may be about 70 Hz and $f_{max}$ may be about 3800 Hz. If it is assumed that the speaker is a woman, $f_{min}$ may be about 70 Hz and $f_{max}$ may be about 4200 Hz. If it is assumed that the speaker is a child, $f_{min}$ may be about 90 Hz and $f_{max}$ may be about 4400 Hz.

At 110, a recognition probability $P_r$ is from a voice analysis of the utterance based on the adjusted model parameters. By way of example and without loss of generality, the voice recognition analysis may use a Hidden Markov Model (HMM) to determine the units of speech in a given voice signal. The speech units may be words, two-word combinations or sub-word units, such as phonemes and the like. The HMM may be characterized by:

L, which represents a number of possible states of the system;

M, which represents the total number of Gaussians that exist in the system;

N, which represents the number of distinct observable features at a given time; these features may be spectral (i.e., frequency domain) or temporal (time domain) features of the speech signal;

$A=\{a_{ij}\}$, a state transition probability distribution, where each $a_{ij}$ represents the probability that the system will transition to the $j^{th}$ state at time t+1 if the system is initially in the $i^{th}$ state at time t;

$B=\{b_j(k)\}$, an observation feature probability distribution for the $j^{th}$ state, where each $b_j(k)$ represents the probability distribution for observed values of the $k^{th}$ feature when the system is in the $j^{th}$ state; and $\pi=\{\pi_i\}$, an initial state distribution, where each component $\pi_i$ represents the probability that the system will be in the ith state at some initial time.

The Hidden Markov Models can be applied to the voice signal to solve one or more basic problems including: (1) the probability of a given sequence of observations obtained from the voice signal; (2) given the observation sequence, what corresponding state sequence best explains the observation sequence; and (3) how to adjust the set of model parameters A, B$\pi$ to maximize the probability of a given observation sequence.

The application of HMMs to speech recognition is described in detail, e.g., by Lawrence Rabiner in "A Tutorial on Hidden Markov Models and Selected Applications in Speech Recognition" in Proceedings of the IEEE, Vol. 77, No. 2, February 1989, which is incorporated herein by reference in its entirety for all purposes.

The voice recognition analyses implemented at 110 may characterize speech by a number of recognizable patterns known as phonemes. Each of these phonemes can be broken down in a number of parts, e.g., a beginning, middle and ending part. It is noted that the middle part is typically the most stable since the beginning part is often affected by the preceding phoneme and the ending part is affected by the following phoneme. The different parts of the phonemes are characterized by frequency domain features that can be recognized by appropriate statistical analysis of the signal. The statistical model often uses Gaussian probability distribution functions to predict the probability for each different state of the features that make up portions of the signal that correspond to different parts of different phonemes. One HMM state can contain one or more Gaussians. A particular Gaussian for a given possible state, e.g., the $k^{th}$ Gaussian can be represented by a set of N mean values $\mu_{ki}$ and variances $\sigma_{ki}$. In a typical speech recognition algorithm one determines which of the Gaussians for a given time window is the largest one. From the largest Gaussian one can infer the most probable phoneme for the time window.

By way of example, the voice recognition analysis at 110 may analyze a time domain signal to obtain N different observable signal features $x_0 \ldots x_n$, where n=N−1. The observed feature of the system may be represented as a vector having components $x_0 \ldots x_n$. These components may be spectral, cepstral, or temporal features of a given observed speech signal.

By way of example and without limitation of the embodiments of the invention, the components $x_0 \ldots x_n$ may be mel frequency cepstral coefficients (MFCCs) of the voice signal obtained at 102. A cepstrum is the result of taking the Fourier transform (FT) of the decibel spectrum as if it were a signal. The cepstrum of a time domain speech signal may be defined verbally as the Fourier transform of the log (with unwrapped phase) of the Fourier transform of the time domain signal. The cepstrum of a time domain signal S(t) may be represented mathematically as $FT(\log(FT(S(t)))+j2\pi q)$, where q is the integer required to properly unwrap the angle or imaginary part of the complex log function. Algorithmically: the cepstrum may be generated by the sequence of operations: signal→FT→log→phase unwrapping→FT →cepstrum.

There is a complex cepstrum and a real cepstrum. The real cepstrum uses the logarithm function defined for real values, while the complex cepstrum uses the complex logarithm function defined for complex values also. The complex cepstrum holds information about magnitude and phase of the initial spectrum, allowing the reconstruction of the signal. The real cepstrum only uses the information of the magnitude of the spectrum. By way of example and without loss of generality, the voice recognition analysis implemented at 110 may use the real cepstrum.

Certain patterns of combinations of components $x_0 \ldots x_n$ correspond to units of speech (e.g., words or phrases) or sub-units, such as syllables, phonemes or other sub-units of words. Each unit or sub-unit may be regarded as a state of the system. The probability density function $f_k(x_0 \ldots x_n)$ for a given Gaussian of the system (the k$^{th}$ Gaussian) may be any type of probability density function, e.g., a Gaussian function having the following form:

$$f_k(x_0 \ldots x_n) = \frac{1}{\sqrt{\delta_k}} \exp\left(-\sum_i \frac{(x_i - \mu_{ki})^2}{2 \cdot \sigma_{ki}^2}\right) \quad (1)$$

where $\delta_k = \prod_i (2\pi \cdot \sigma_{ki}^2)$ $i = 1 \ldots N, k = 1 \ldots M.$ In the above equations, "i" is an index for feature and "k" is an index for Gaussian. In equation (1), the subscript k is an index for the Gaussian function. There may be several hundred to several hundred thousand Gaussians used by the speech recognition algorithm. The quantity $\mu_{ki}$ is a mean value for the feature $x_i$ in the k$^{th}$ Gaussian of the system. The quantity $\sigma_{ki}^2$ is the variance for $x_i$ in the k$^{th}$ Gaussian. One or more Gaussians may be associated with one or more different states. For example, there may be L different states, which contain a total number of M Gaussians in the system. The quantity $\mu_{ki}$ is the mean for all measurements of $x_i$ that belong to $f_k(x_0 \ldots x_N)$ over all time windows of training data and $\sigma_{ki}$ is the variance for the corresponding measurements used to compute $\mu_{ki}$.

The probability for each Gaussian can be computed equation (1) to give a corresponding recognition probability $P_r$. From the Gaussian having the maximum probability one can build a most likely, state, word, phoneme, character, etc. for that particular time window. Note that it is also possible to use the most probable state for a given time window to help in determining the most probable state for earlier or later time windows, since these may determine a context in which the state occurs.

Figure 2:
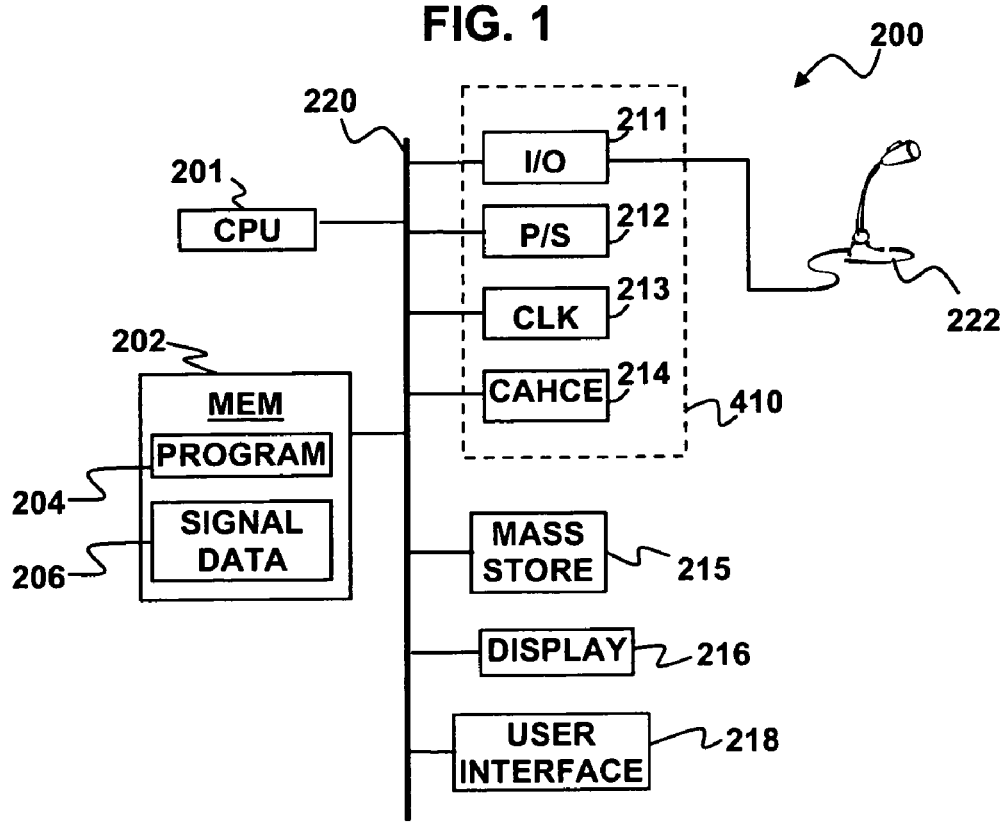
FIG. 2 is a block diagram illustrating a voice recognition system according to an embodiment of the present invention.

According to embodiments of the present invention, a recognition method (e.g., a voice recognition method) of the type depicted in FIG. 1A or FIG. 1B operating as described above may be implemented as part of a signal processing apparatus 200, as depicted in FIG. 2. The system 200 may include a processor 201 and a memory 202 (e.g., RAM, DRAM, ROM, and the like). In addition, the signal processing apparatus 200 may have multiple processors 201 if parallel processing is to be implemented. The memory 202 includes data and code configured as described above. Specifically, the memory includes data representing signal features 204, and probability functions 206 each of which may include code, data or some combination of both code and data.

The apparatus 200 may also include well-known support functions 210, such as input/output (I/O) elements 211, power supplies (P/S) 212, a clock (CLK) 213 and cache 214. The apparatus 200 may optionally include a mass storage device 215 such as a disk drive, CD-ROM drive, tape drive, or the like to store programs and/or data. The controller may also optionally include a display unit 216 and user interface unit 218 to facilitate interaction between the controller 200 and a user. The display unit 216 may be in the form of a cathode ray tube (CRT) or flat panel screen that displays text, numerals, graphical symbols or images. The user interface 218 may include a keyboard, mouse, joystick, light pen or other device. In addition, the user interface 218 may include a microphone, video camera or other signal transducing device to provide for direct capture of a signal to be analyzed. The processor 201, memory 202 and other components of the system 200 may exchange signals (e.g., code instructions and data) with each other via a system bus 220 as shown in FIG. 2. A microphone 222 may be coupled to the apparatus 200 through the I/O functions 211

As used herein, the term I/O generally refers to any program, operation or device that transfers data to or from the system 200 and to or from a peripheral device. Every transfer is an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, camera, external Zip drive or scanner as well as internal devices, such as a CD-ROM drive, CD-R drive or internal modem or other peripheral such as a flash memory reader/writer, hard drive.

The processor 201 may perform signal recognition of signal data 206 and/or probability in program code instructions of a program 204 stored and retrieved by the memory 202 and executed by the processor module 201. Code portions of the program 203 may conform to any one of a number of different programming languages such as Assembly, C++, JAVA or a number of other languages. The processor module 201 forms a general-purpose computer that becomes a specific purpose computer when executing programs such as the program code 204. Although the program code 204 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

In one embodiment, among others, the program code 204 may include a set of processor readable instructions that implement a method having features in common with the method 100 of FIG. 1A or the method 110 of FIG. 1B. The program 204 may generally include one or more instructions that direct the processor 201 to obtain a voice signal for an utterance of a speaker; determine a runtime pitch from the voice signal for the utterance; categorize the speaker based on the runtime pitch; adjust one or more acoustic model parameters based on a categorization of the speaker; and perform a voice recognition analysis of the utterance based on the acoustic model parameters.

By way of example, the program 204 may be part of a larger overall program, such as a program for a computer game. In certain embodiments of the invention, the program code 204 may prompt a speaker to speak a word or phrase (e.g., the speaker's name) during an initialization phase (e.g., at the start of a game) to provide a speech sample. From this sample, the program 204 may proceed as described above with respect to FIG. 1 to find optimal parameters (e.g., $f_{min}$ and $f_{max}$) for that speaker and run the voice recognition at 110 using those parameters. The parameters may be saved after the program concludes and used again when that speaker uses the program.

Embodiments of the present invention provide for more robust and more accurate speech recognition. In one example of speech recognition employing acoustic model parameter selection using pitch-based speaker categorization with a single female speaker produced 94.8% word accuracy. A conventional speech recognition algorithm not employing acoustic model parameter selection using pitch-based speaker categorization achieved only 86.3% word accuracy with the same female speaker.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for voice recognition, the method comprising:
obtaining a voice signal for an utterance of a speaker;
determining a runtime pitch from the voice signal for the utterance;
categorizing the speaker as male, female or child based on the runtime pitch;
using the categorization as a basis for dynamically adjusting a maximum frequency $f_{max}$ and a minimum frequency $f_{min}$ of a filter bank used for processing the input utterance to produce an output, and using corresponding gender or age specific acoustic models to perform voice recognition based on the filter bank output.

2. The method of claim 1 wherein determining the runtime pitch includes determining a moving average pitch $p_{avg}(t)$ at time t given by $$p_{avg}(t) = \frac{1}{NP} \sum_{t_i} p(t_i),$$

where the sum is taken over a number NP of pitch measurements taken at times $t_i$ during a time window.

3. The method of claim 2 wherein each of the pitches $p(t_i)$ is above a predetermined threshold.

4. The method of claim 2 wherein determining the runtime pitch includes a calculation of the type:
$p_{run}(t) = c \cdot p_{run}(t-1) + (1-c) \cdot p(t)$, where c is a constant between 0 and 1 and p(t) is a current pitch value at time t.

5. The method of claim 1 wherein categorizing the speaker includes determining the speaker's age and/or gender.

6. The method of claim 5 wherein determining the speaker's age and/or gender includes determining whether the runtime pitch falls into a range, wherein the range depends on the speakers age and/or gender.

7. The method of claim 5 wherein determining the speaker's age and/or gender includes determining from the pitch whether the speaker is a male, female or child speaker.

8. The method of claim 1, further comprising storing the speaker categorization and/or the one or more acoustic model parameters based on the categorization of the speaker, and associating the speaker categorization of the speaker and/or the one or more acoustic model parameters based on the categorization of the speaker with a particular speaker.

9. The method of claim 8, further comprising using the stored speaker categorization and/or the one or more acoustic model parameters based on the categorization of the speaker during a subsequent voice recognition analysis for the speaker.

10. A voice recognition system, comprising:
an interface adapted to obtain a voice signal;
one or more processors coupled to the interface; and
a memory coupled to the interface and the processor, the memory having embodied therein a set of processor readable instructions for configured to implement a method for voice recognition, the processor readable instructions including:
an instruction for obtaining a voice signal for an utterance of a speaker;
an instruction for determining a runtime pitch from the voice signal for the utterance;
an instruction for categorizing the speaker as male, female or child based on the runtime pitch;
an instruction for using the categorization as a basis for dynamically adjusting a maximum frequency $f_{max}$ and a minimum frequency $f_{min}$ of a filter bank used for processing the input utterance to produce an output, and using corresponding gender or age specific acoustic models to perform voice recognition based on the filter bank output.

11. The method of claim 1, wherein the minimum frequency $f_{min}$ is about 70 Hz and the maximum frequency $f_{max}$ is about 3800 Hz if the speaker is categorized as a man.

12. The method of claim 1, wherein the minimum frequency $f_{min}$ is about 70 Hz and the maximum frequency $f_{max}$ is about 4200 Hz if the speaker is categorized as a woman.

13. The method of claim 1, wherein the minimum frequency $f_{min}$ is about 90 Hz and the maximum frequency $f_{max}$ is about 4400 Hz if the speaker is categorized as a child.

* * * * *